(12) United States Patent
Giametta

(10) Patent No.: US 9,267,513 B2
(45) Date of Patent: Feb. 23, 2016

(54) METHOD FOR CONTROLLING TEMPERATURE OF A TURBINE ENGINE COMPRESSOR AND COMPRESSOR OF A TURBINE ENGINE

(75) Inventor: Andrew Paul Giametta, Greenville, SC (US)

(73) Assignee: General Electric Company, Schenectady, NY (US)

( * ) Notice: Subject to any disclaimer, the term of this patent is extended or adjusted under 35 U.S.C. 154(b) by 932 days.

(21) Appl. No.: 13/489,552

(22) Filed: Jun. 6, 2012

(65) Prior Publication Data

US 2013/0330166 A1 Dec. 12, 2013

(51) Int. Cl.
*F04D 29/58* (2006.01)
*F01D 5/08* (2006.01)
*F02C 7/18* (2006.01)

(52) U.S. Cl.
CPC .............. *F04D 29/584* (2013.01); *F01D 5/084* (2013.01); *F02C 7/185* (2013.01)

(58) Field of Classification Search
CPC ........... F01D 5/08; F01D 5/081; F01D 5/084; F01D 5/085; F01D 5/088; F01D 25/08; F01D 25/10; F01D 25/12; F01D 25/14; F04D 29/582; F04D 29/584; F02C 7/125; F02C 7/18; F02C 7/185
See application file for complete search history.

(56) References Cited

U.S. PATENT DOCUMENTS

| | | | |
|---|---|---|---|
| 4,137,705 A | | 2/1979 | Andersen et al. |
| 4,255,083 A | * | 3/1981 | Andre et al. .................. 415/119 |
| 7,555,892 B2 | | 7/2009 | Vosberg |
| 2007/0095072 A1 | | 5/2007 | Olmes et al. |

FOREIGN PATENT DOCUMENTS

| | | |
|---|---|---|
| EP | 2458147 A2 | 5/2012 |
| GB | 655304 A | 7/1951 |

OTHER PUBLICATIONS

Unofficial English Translation of Chinese Office Action issued in connection with corresponding CN Application No. 201310223973.7 on Jul. 20, 2015.

* cited by examiner

*Primary Examiner* — Richard Edgar
*Assistant Examiner* — Brian O Peters
(74) *Attorney, Agent, or Firm* — Ernest G. Cusick; Frank A. Landgraff

(57) ABSTRACT

According to one aspect of the invention, a method for temperature control of a turbine engine compressor includes directing a fluid from a first region proximate a main flow path in a downstream portion of a structure in a compressor to an upstream portion of the structure, wherein the fluid is cooled as the fluid flows through the upstream portion of the structure. The method further includes directing the fluid from the upstream portion of the structure downstream to a second region of the compressor to cool the second region, wherein the fluid is directed through passages in the upstream and downstream portions of the structure thereby substantially conserving an energy of the fluid within the structure and wherein a pressure of the second region is less than a pressure of the first region.

16 Claims, 3 Drawing Sheets

METHOD FOR CONTROLLING TEMPERATURE OF A TURBINE ENGINE COMPRESSOR AND COMPRESSOR OF A TURBINE ENGINE

BACKGROUND OF THE INVENTION

The subject matter disclosed herein relates to turbine engines. More particularly, the subject matter relates to controlling temperatures of rotor components.

In gas turbine engines, a combustor converts chemical energy of a fuel or an air-fuel mixture into thermal energy. The thermal energy is conveyed by a fluid, often air from a compressor, via a transition piece to a turbine where the thermal energy is converted to mechanical energy. These fluids flow downstream to one or more turbines that extract energy therefrom to produce the mechanical energy output as well as power to drive the compressor.

As designs of turbine engines increase pressure ratios to improve performance, components are exposed to increased temperatures. The temperature increase can cause thermal fatigue and wear for certain parts, such as compressor rotor components. The material used to make the components may be changed to a more durable material. However, altering materials used for compressor rotor components can be costly.

BRIEF DESCRIPTION OF THE INVENTION

According to one aspect of the invention, a method for temperature control of a turbine engine compressor includes directing a fluid from a first region proximate a main flow path in a downstream portion of a structure in a compressor to an upstream portion of the structure, wherein the fluid is cooled as the fluid flows through the upstream portion of the structure. The method further includes directing the fluid from the upstream portion of the structure downstream to a second region of the compressor to cool the second region, wherein the fluid is directed through passages in the upstream and downstream portions of the structure thereby substantially conserving an energy of the fluid within the structure and wherein a pressure of the second region is less than a pressure of the first region.

According to another aspect of the invention, a compressor of a turbine engine includes a structure in the compressor including a downstream portion and an upstream portion and a fluid passage disposed in the downstream portion of the structure and the upstream portion of the structure, the fluid passage configured to direct fluid from a first region proximate a main flow path in the downstream portion into the upstream portion to cool the fluid as the fluid flows through the upstream portion. The compressor also includes a second region in the compressor configured to be cooled as the second region receives the fluid from the fluid passage after the fluid is cooled and flows through the upstream portion, wherein the fluid passage is contained within the structure and substantially conserves an energy of the fluid within the structure, wherein a pressure of the second region is less than a pressure of the first region and wherein a temperature of the downstream portion of the structure is greater than a temperature of the upstream portion.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
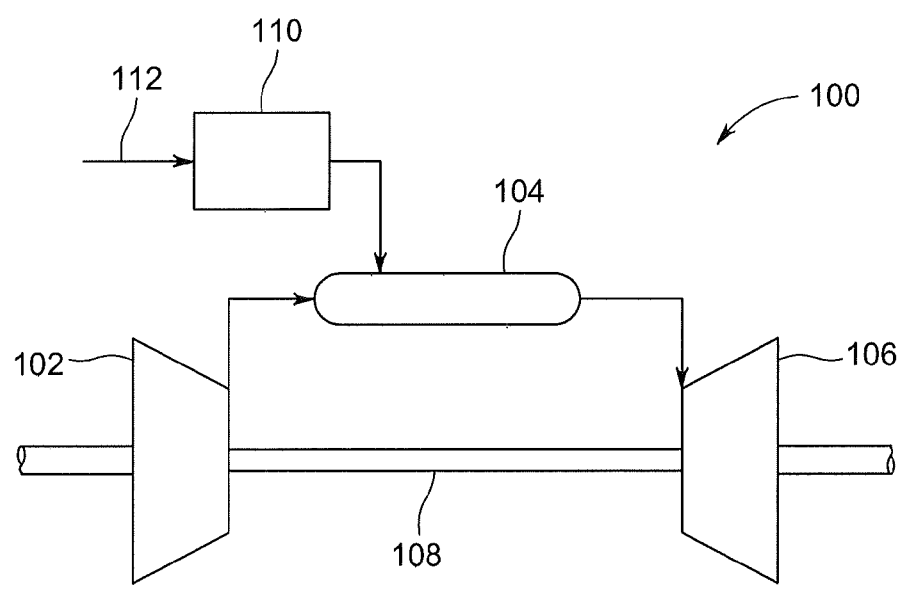
FIG. 1 is a block diagram of a turbine engine according to an embodiment.

FIG. 1 is a schematic diagram of an embodiment of a gas turbine system 100. The system 100 includes a compressor 102, a combustor 104, a turbine 106, a shaft 108 and a fuel nozzle 110. In an embodiment, the system 100 may include a plurality of compressors 102, combustors 104, turbines 106, shafts 108 and fuel nozzles 110. As depicted, the compressor 102 and turbine 106 are coupled by the shaft 108. The shaft 108 may be a single shaft or a plurality of shaft segments coupled together to form shaft 108. Further, the system 100 may also include a plurality of compressors 102 and turbines 106 disposed about a turbine axis (not shown).

In an aspect, the combustor 104 uses liquid and/or gas fuel, such as natural gas or a hydrogen rich synthetic gas, to run the turbine engine. For example, fuel nozzles 110 are in fluid communication with a fuel supply 112 and pressurized air from the compressor 102. The fuel nozzles 110 create an air-fuel mix, and discharge the air-fuel mix into the combustor 104, thereby causing a combustion that creates a hot pressurized exhaust gas. The combustor 104 directs the hot pressurized exhaust gas through a transition piece into a turbine nozzle (or "stage one nozzle"), causing turbine 106 rotation as the gas exits the nozzle or vane and gets directed to the turbine bucket or blade. The rotation of turbine 106 causes the shaft 108 to rotate, thereby compressing the air as it flows into the compressor 102. In an embodiment, combustion dynamics and associated temperatures can lead to thermal distress of components, such as components in the compressor 102. Embodiments that utilize components external to the compressor can be complex, costly and energy inefficient. An arrangement that may be utilized for controlling temperatures in the compressor while substantially conserving energy within the compressor 102 is discussed in detail below with reference to FIGS. 2-3.

As used herein, "downstream" and "upstream" are terms that indicate a direction relative to the flow of working fluid through the turbine. As such, the term "downstream" refers to a direction that generally corresponds to the direction of the flow of working fluid, and the term "upstream" generally refers to the direction that is opposite of the direction of flow of working fluid. The term "radial" refers to movement or position perpendicular to an axis or center line. It may be useful to describe parts that are at differing radial positions with regard to an axis. In this case, if a first component resides closer to the axis than a second component, it may be stated herein that the first component is "radially inward" of the second component. If, on the other hand, the first component resides further from the axis than the second component, it can be stated herein that the first component is "radially outward" or "outboard" of the second component. The term "axial" refers to movement or position parallel to an axis.

Finally, the term "circumferential" refers to movement or position around an axis. Although the following discussion primarily focuses on gas turbines, the concepts discussed are not limited to gas turbines and may apply to any suitable rotating machinery, including steam turbines. Accordingly, the discussion herein is directed to gas turbine embodiments, but may apply to other turbomachinery.

Figure 2:
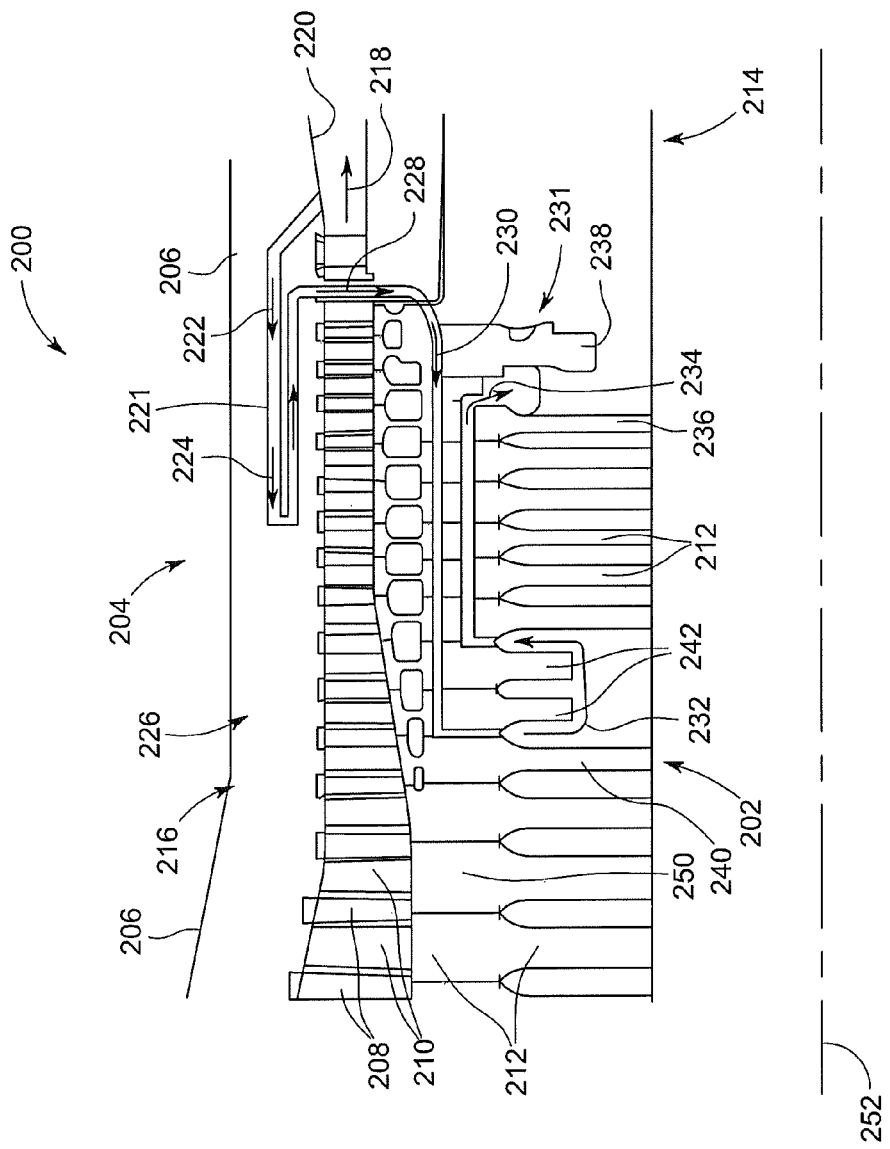
FIG. 2 is a side sectional view of a portion of a compressor of a turbine engine according to an embodiment.

FIG. 2 is a side sectional view of a portion of an exemplary compressor 200 disposed about a turbine axis 252. The compressor 200 includes a rotor assembly or rotor structure 202 and a stator assembly or stator structure 204. A casing 206 in the stator structure 204 is coupled to a plurality of airfoils or blades 208. Air foils or blades 210 also extend from rotor wheels 212 in the rotor structure 202, where fluid flow across the blades 208, 210 drives the compressor 200. The compressor 200 has a downstream portion 214 and an upstream portion 216 with respect to fluid flow along a main flow path 218 in the compressor 200. In an embodiment, the upstream portion 216 of both the rotor structure 202 and stator structure 204 experiences relatively lower pressures and higher temperatures during turbine operation as compared to the downstream portion 214. In an embodiment, fluid from the main flow path 218 is diverted proximate a high pressure region 220 to flow through a passage 221 along fluid flow path 222 in an upstream direction. As the fluid flows upstream from fluid flow path 222 through passage 221 to fluid flow path 224, the fluid is cooled due to the lower temperatures and pressures of components in the upstream portion 216 of the compressor 200. The upstream components absorb heat from the fluid, thereby cooling the fluid as it flows through the upstream portion 216. The fluid flows into the passage 221 proximate a downstream region near the main flow path 218, where the pressure and temperature of the fluid is relatively high. Lower pressure in the upstream portion of the compressor causes the fluid to flow through the passage 221. As depicted, the fluid flows along a fluid flow path 224 proximate a middle portion of the compressor and is re-directed back downstream within the compressor. In another embodiment, the fluid flows along a fluid flow path radially outside first and second stage blades of the compressor. In embodiments, the fluid is any suitable fluid for cooling parts, such as a mixture of air, fuel, an air-fuel mix or exhaust. In an embodiment, the fluid is referred to as air, where a majority of the fluid mixture comprises air.

After the fluid is cooled proximate a low pressure and low temperature region 226 of the stator structure 204 it is directed downstream through a flow path 228 in a blade to the rotor structure 202. The fluid flows along a flow path 230 proximate a high pressure and high temperature region 231 of the rotor structure 202. In an embodiment, the fluid flows upstream through the rotor structure 202. The fluid flows along a path 232 proximate upstream rotor wheels 240 and 242, where the lower temperature proximate the upstream region 216 and rotor wheels 240, 242 further cool the fluid. Further, the higher pressure in the path 230 drives the fluid to path 234 and through the passage. When viewing an exemplary embodiment of the rotor structure 202 as a whole, a lower pressure in the upstream region 216 draws cooling fluid flow relative to the higher pressure in the downstream region 214. The fluid then flows from the upstream region 216 of the rotor structure 202 through downstream path 234 to cool downstream rotor wheels 236 and 238. In one embodiment, the fluid flows about a wheel 238 in the last stage and a wheel 236 in the second to last stage of the compressor 200. In embodiments, the rotor wheels are made by forging, casting, machining or another suitable method that forms the wheels from a suitable durable material, such as a metal alloy (e.g., iron-based alloy).

By flowing the cooling fluid (e.g., air) through upstream portions of the stator and rotor components to cool the fluid, energy is substantially conserved within the stator and rotor structures, as heat is transferred from the fluid to the structures as the fluid is cooled. Specifically, the upstream region 216 of the compressor 200, due to the relatively low pressure and temperature, absorb heat from the flowing fluid, thus providing a cooling mechanism for the fluid. Accordingly, the fluid is cooled while the upstream region 216 of the rotor and stator structures are heated, thus substantially conserving energy within the compressor 200. The heated components may then transfer the heat to working fluid in the main flow path 218, where work is extracted from the fluid within the turbine. In addition, as compared to embodiments of cooling systems that use external components (i.e., external to the compressor 200) to cool rotor parts, embodiments of the compressor 200 have no external or additional parts, thereby simplifying assembly and reducing costs. Further, when compared to embodiments that use external parts, the depicted embodiment is integrated within the compressor and uses less energy for cooling than embodiments with external components that lose heat to the turbine's surroundings. In addition, external cooling components may also use energy from the turbine engine and, therefore, reduce turbine efficiency.

Figure 3:
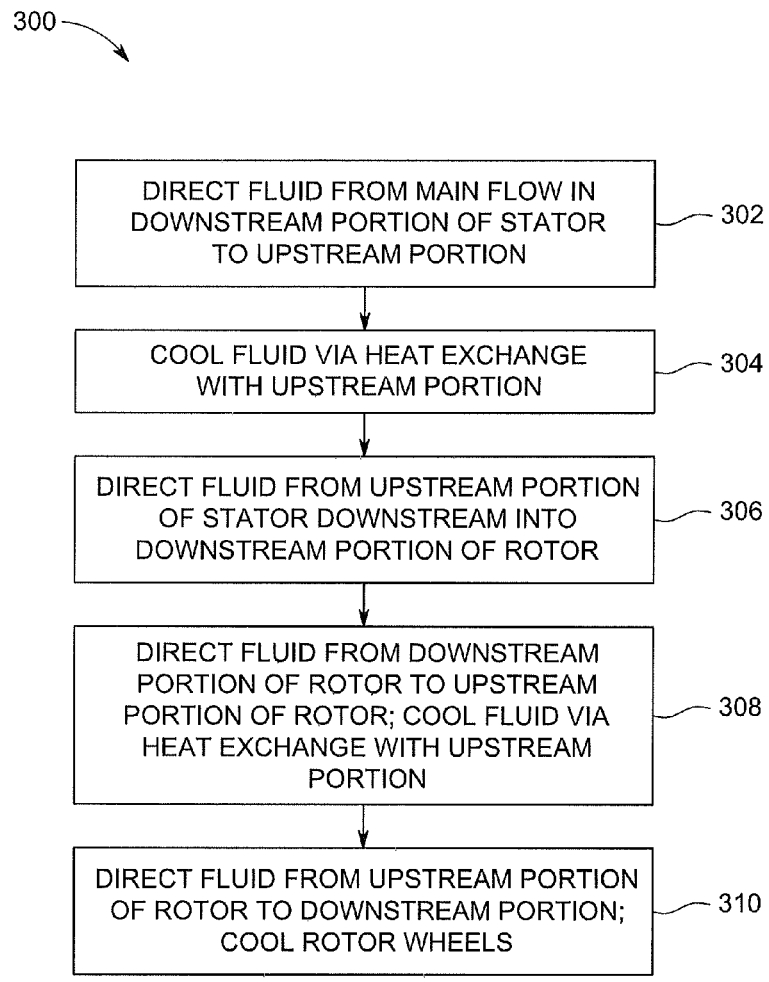
FIG. 3 is a flow chart of a process for controlling temperature of a compressor according to an embodiment.

FIG. 3 is a flow chart 300 of an exemplary process for controlling a temperature of a compressor. The depicted blocks may be part of or in addition to another process and/or may be performed in any suitable order. In block 302, fluid is directed from a main flow path ("MFP") in a turbine engine near a downstream portion of a stator to an upstream portion of the stator. In block 304, the fluid is cooled in the upstream portion of the stator by transferring heat to the upstream stator parts. In block 306, the fluid is directed from the upstream portion of the stator to a downstream portion of the stator. The fluid is then directed into the downstream portion of the rotor. In block 308, fluid is directed from the downstream portion of the rotor to an upstream portion. The fluid is cooled in the upstream portion of the rotor by transferring heat to upstream rotor parts. In block 310, the fluid is directed from the upstream portion to the downstream portion of the rotor to cool the rotor wheels. By cooling the rotor wheels in the downstream portion, pressure ratios may be increased without adversely affecting the rotor components, thus providing improved turbine engine performance and improved durability for the rotor assembly. The pressure ratio is the ratio of the downstream main flow path pressure to upstream main flow path pressure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:
1. A method for temperature control of a turbine engine compressor, the method comprising:
directing a fluid from a first region proximate a main flow path in a downstream portion of a structure in a compressor to an upstream portion of the structure, wherein the fluid is cooled as the fluid flows through the upstream portion of the structure; and directing the fluid from the upstream portion of the structure downstream to a second region of the compressor to cool the second region, wherein the fluid is directed through passages in the upstream and downstream portions of the structure thereby substantially conserving an energy of the fluid within the structure and wherein a pressure of the second region is less than a pressure of the first region;

wherein directing the fluid from the first region proximate the main flow path in the downstream portion of the structure comprises directing the fluid from a downstream portion of a stator to an upstream portion of the stator; and wherein directing the fluid from the upstream portion of the structure downstream to the second region of the compressor to cool the second region comprises directing the fluid to the second region including a rotor wheel in a last stage of a rotor located radially inside the stator.

2. The method of claim 1, wherein directing the fluid from the first region proximate the main flow path comprises directing the fluid proximate the main flow path in the stator downstream of a last stage of the compressor.

3. The method of claim 1, wherein the upstream portion of the stator is proximate to and radially outside a first stage of the compressor.

4. The method of claim 1, wherein a temperature of the downstream portion of the structure is greater than a temperature of the upstream portion of the structure.

5. A method for temperature control of a turbine engine compressor, the method comprising:

directing a fluid from a first region proximate a main flow path in a downstream portion of a structure in a compressor to an upstream portion of the structure, wherein the fluid is cooled as the fluid flows through the upstream portion of the structure; and directing the fluid from the upstream portion of the structure downstream to a second region of the compressor to cool the second region, wherein the fluid is directed through passages in the upstream and downstream portions of the structure thereby substantially conserving an energy of the fluid within the structure and wherein a pressure of the second region is less than a pressure of the first region wherein directing the fluid from the first region in the downstream portion of the structure comprises directing the fluid from a downstream portion of a rotor to an upstream portion of the rotor.

6. The method of claim 5, wherein directing the fluid from the first region proximate the main flow path in the downstream portion of the structure comprises directing the fluid from a downstream portion of the rotor around a rotor wheel in an upstream portion of the rotor.

7. The method of claim 6, wherein directing the fluid from the upstream portion of the structure downstream to the second region of the compressor to cool the second region comprises directing the fluid proximate rotor wheels downstream of a first stage of the rotor to cool the rotor wheels.

8. The method of claim 6, wherein directing the fluid from the upstream portion of the structure downstream to the second region of the compressor to cool the second region comprises directing the fluid proximate a second rotor wheel that is part of a last stage of the rotor.

9. A compressor of a turbine engine, the compressor comprising:

a structure in the compressor comprising a downstream portion and an upstream portion;

a fluid passage disposed in the downstream portion of the structure and the upstream portion of the structure, the fluid passage configured to direct fluid from a first region proximate a main flow path in the downstream portion into the upstream portion to cool the fluid as the fluid flows through the upstream portion; and a second region in the compressor configured to be cooled as the second region receives the fluid from the fluid passage after the fluid is cooled and flows through the upstream portion, wherein the fluid passage is contained within the structure and substantially conserves an energy of the fluid within the structure, wherein a pressure of the second region is less than a pressure of the first region and wherein a temperature of the downstream portion of the structure is greater than a temperature of the upstream portion, wherein the structure comprises stator, wherein an upstream portion of the stator provides a cooling mechanism for the fluid, wherein the second region comprises a region including a rotor wheel in a last stage of a rotor located radially inside the stator.

10. The compressor of claim 9, wherein the first region comprises a main flow path in the stator downstream of a last compressor stage and wherein the fluid passage in the upstream portion of the stator is radially outside a first stage of the compressor.

11. The compressor of claim 9, wherein the structure comprises a rotor, wherein an upstream portion of the rotor provides a cooling mechanism for the fluid.

12. The compressor of claim 11, wherein the second region comprises a region proximate rotor wheels downstream of the rotor, the fluid being configured to cool the rotor wheels.

13. The compressor of claim 11, wherein the second region of the compressor comprises a region proximate a second rotor wheel that is part of a last stage of the rotor, the fluid being configured to cool the second rotor wheel.

14. A method for controlling a temperature of a turbine engine compressor, the method comprising:

directing a fluid from a main flow path in a downstream portion of a stator in the turbine to an upstream portion of the stator, wherein the upstream portion of the stator cools the fluid as the fluid flows from the main flow path through the upstream portion of the stator;

directing the fluid from the upstream portion of the stator through an upstream portion of a rotor disposed radially within the stator, wherein the upstream portion of the rotor provides cooling for the fluid as the fluid flows through the upstream portion of the rotor; and directing the fluid from the upstream portion of the rotor to a downstream portion of the rotor to cool the downstream portion of the rotor, wherein the fluid is directed through passages within the stator and rotor thereby substantially conserving an energy of the fluid within a structure of the turbine engine compressor.

15. The method of claim 14, wherein directing the fluid from the upstream portion of the stator through the upstream portion of the rotor comprises directing the fluid through the downstream portion of the stator into a downstream portion of the rotor and into the upstream portion of the rotor.

16. The method of claim 14, wherein a temperature of the downstream portions of the stator and rotor is greater than a temperature of the upstream portions of the stator and rotor.

\* \* \* \* \*